United States Patent [19]
Weiss

[11] 3,798,454
[45] Mar. 19, 1974

[54] DEVICE FOR COUNTING ACCELERATIONS, MEASURING MAGNITUDES THEREOF, RECORDING AND CLASSIFYING THE SAME ACCORDING TO MAGNITUDE

[75] Inventor: David E. Weiss, Wyncote, Pa.

[73] Assignee: The United States of America as represented by the Secretary of the Navy, Washington, D.C.

[22] Filed: Apr. 25, 1972

[21] Appl. No.: 247,480

[52] U.S. Cl. .......... 250/231, 73/517 R, 235/92 AE, 250/232
[51] Int. Cl. ........................................... H03k 21/30
[58] Field of Search ........... 250/231, 232, 208, 209; 356/27, 28; 73/517 R, 492; 235/92 AE

[56] References Cited
UNITED STATES PATENTS

| | | |
|---|---|---|
| 3,448,621 | 6/1969 | Magda et al. .................... 73/517 R |
| 3,643,513 | 2/1972 | Weaver ............................. 73/517 R |
| 3,610,895 | 10/1971 | Wollesen ........................ 235/92 AE |
| 3,038,345 | 6/1962 | Hoeppner et al. ................ 73/517 R |
| 3,310,978 | 3/1967 | Davis ................................ 73/516 X |
| 3,275,835 | 9/1966 | Morrison ......................... 250/231 R |
| 2,957,653 | 10/1960 | Gillum ............................. 73/517 X |
| 2,747,797 | 5/1956 | Beaumont ........................... 250/208 |

Primary Examiner—Walter Stolwein
Attorney, Agent, or Firm—R. S. Sciascia; Henry Hansen

[57] ABSTRACT

An accelerometer comprising a resiliently mounted shutter element mounted between a light source and an array of light detecting elements so that acceleration forces move the shutter element to permit the light source to activate one or more of the light detecting elements according to the magnitude of the forces and generate signals which are recorded, classified according to magnitude, and counted for evaluation at the end of a predetermined period.

4 Claims, 1 Drawing Figure

PATENTED MAR 19 1974 3,798,454
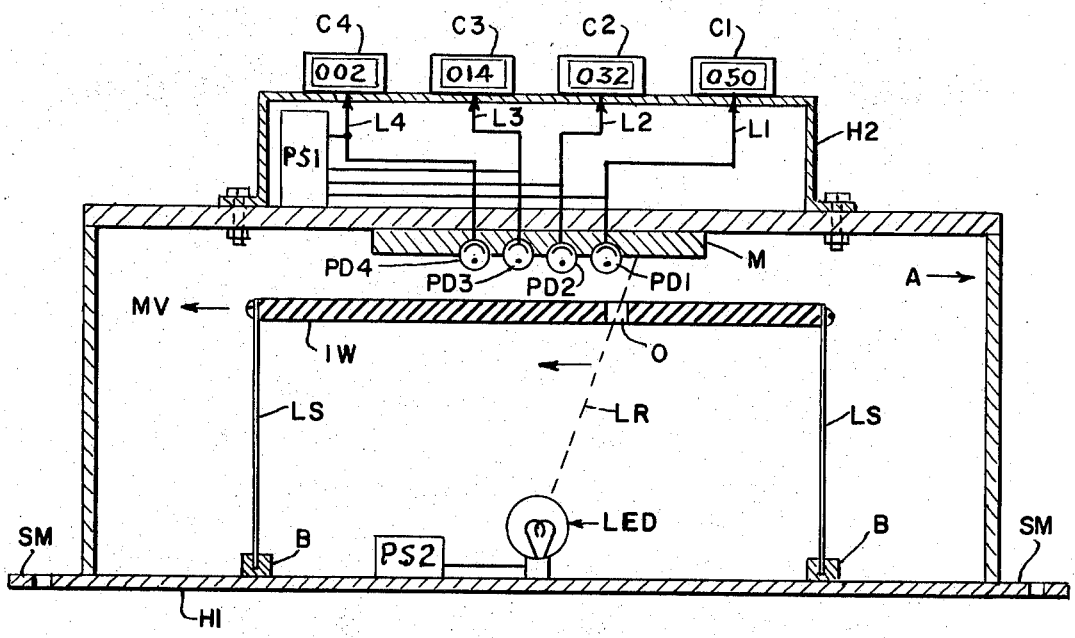

DEVICE FOR COUNTING ACCELERATIONS, MEASURING MAGNITUDES THEREOF, RECORDING AND CLASSIFYING THE SAME ACCORDING TO MAGNITUDE

BACKGROUND OF THE INVENTION

This invention relates generally to the field of measuring, recording and classifying displacements or accelerations on a given body according to magnitude. More specifically the invention involves a simple compact lightweight frictionless device to be secured on vehicles, especially aircraft to thus measure, record, and classify displacements or accelerations in a desired direction for evaluation at the end of a predetermined use period.

Generally similar devices are known in the prior art for measuring and recording accelerations using relative movement of a shutter operating between a light source and one or more light detecting elements. However these prior art devices apparently have not been designed to function most advantageously in high speed aircraft in which space, weight, and power available are critically limited. Most of the similar prior art devices known to applicant appear somewhat complex in structure and function, bulky and otherwise not well adapted for airborne installation and use. Many depend on mechanical or electromechanical switches which experience fatigue failures. In addition none of the known prior art devices provide for the very simple and effective means of classifying the measured accelerations while recording them to make possible quick analysis at the end of a testing period.

SUMMARY OF THE INVENTION

The shortcomings and deficiencies of the prior art devices have been overcome and the hereinafter-mentioned objects of the invention have been achieved by an improved device for counting accelerations of an object in a given direction, digitally measuring the magnitude of such accelerations, and concurrently recording and classifying the accelerations according to their magnitudes, said device comprising in combination: a housing means; an inertia member resiliently mounted in said housing means for movement in a given direction between a first rest position and a series of positions at progressively increasing distances from the first position; a plurality of radiant energy detecting elements mounted in said housing means in a series of spaced locations, a plurality of counting and count number indicating means mounted on said housing means and each corresponding to and each operatively connected to one of said radiant energy detecting elements, a radiant energy source mounted in said housing means, said inertia weight member positioned and mounted between said radiant energy source and said detecting elements such that in said first rest position of the inertia member said member blocks radiant energy produced by said source from striking any of said detecting elements, said source, said inertia member, and said detecting elements constructed, aligned, and arranged such that accelerations in the given direction cause movement of said inertia member from said rest position progressively through said positions at increasing distances from the rest position and progressively permits radiant energy from said source to be detected by one or more of said detecting elements according to the magnitude of the acceleration and related distance traversed by the inertia member in response thereto, each detection of radiant energy by said detecting elements being counted and indicated by the corresponding counting and indicating means to provide an indication classifying the number of accelerations experienced according to the level of acceleration and related inertia member movement for evaluation at the end of a predetermined test period.

STATEMENT OF THE OBJECTS OF THE INVENTION

It is an object of this invention to provide an improved airborne acceleration measuring recording and classifying device which requires minimum weight and space, which is simple and economical to fabricate, maintain and operate yet is rugged, essentially frictionless, and reliable in operation.

It is another object to provide such a device which operates with a long service life to provide the classified stored information relating to accelerations encountered during aircraft testing in a manner making possible quick evaluation and determination of stresses to which the aircraft has been subjected in given directions.

Other objects, advantages, and novel features of the invention will become apparent from the following detailed description of the invention when considered in conjunction with the accompanying drawings wherein:

BRIEF DESCRIPTION OF THE DRAWING

FIGURE of the drawing is a partially schematic vertical cross-sectional view through an acceleration measuring, classifying and recording device embodying principles of the invention.

DESCRIPTION OF THE PREFERRED EMBODIMENT

A preferred embodiment of the invention is shown in the one drawing FIGURE and consists of a main housing structure H1 which is provided with outwardly-extending apertured plugs SM which permit securing of the device in operative position to a portion of aircraft structure. A light source LED is mounted in the bottom portion of housing H1 as shown and is provided with a power supply means PS2 operatively connected therewith. Also mounted on the bottom portion of housing H1 are support brackets B, on which are secured leaf spring elements LS resiliently supporting an elongated inertia member IW provided with an aperture 0. Inertia member IW is formed of any suitable opaque material and is resiliently mounted for movement generally in the direction of its line of elongation as indicated by the arrow MV in the drawing in response to an acceleration of the device in the direction of arrow A. As such movement occurs a beam or ray of light shown at LR sweeps across the upper portion of the main housing H1 in a movement the extent of which is proportional to the degree of acceleration experienced by the device. A plurality of light-detecting elements PD1, PD2, PD3, and PD4 are mounted on a support member M which is secured by any suitable means to the upper portion of main housing H1. These light-detecting elements are arranged in a linear spaced series of positions as shown and are so aligned relative to the position of the light source LED and aperture 0 in the inertia member IW that the light ray LR sequentially passes over and illuminates each light-detecting element as it is moved through its full range of movement by a sufficiently large acceleration.

Light-detecting elements PD1-PD4 may be of any suitable conventional type known as photocells, photoconductors, or photo-transistors. Preferably they will act as switches in separate circuits which when illuminated will have their resistance sharply reduced to apply power to an electrical work unit for the duration of the period of illumination.

Each light-detecting element is operatively connected as shown schematically in the drawing to a suitable power supply unit such as a battery PS1 and to one of the indicating counter units C1, C2, C3, or C4. Auxiliary housing member H2, secured to housing member H1 by suitable means such as the machine bolts shown, provides an enclosure for battery PS1 and for electrical conduits connecting the light-detecting elements with the power source and counter units. In addition housing member H2 provides a base or supporting structure upon which the counter units are mounted and secured by suitable conventional means not shown. Each counter unit is of a type actuatable by an electrical power pulse applied by its associated light-detecting element when illuminated, to count the pulses and indicate the number of pulses received up to a limit determined by the time period for which it is desired to measure and count such pulses which obviously are related to accelerations experienced by the device.

It will be apparent from the foregoing description that for each acceleration applied to the device and inertia member IW in direction A, the resulting movement of member IW and aperture 0 in direction MV will activate one or more of the light-detecting elements PD1-PD4 according to the magnitude of the acceleration. The positions of elements PD1-PD4 are predetermined and established to correspond to levels of acceleration which it is desired to measure and count.

When the device of the invention, with counters set to zero and all parts in operative condition, is secured in position on an aircraft and aligned to measure accelerations in the desired direction, each acceleration in this direction will result in activation of one or more of elements PD1-PD4 and a count will be registered in a counter unit each time the corresponding detecting element is activated. At the end of a test period of aircraft operation, the counters are examined and reset if necessary. Assuming the counters indicate the counts shown in the drawing and assuming further the simplest design instrument, the count of 2 on counter unit C4 indicates that there has been one acceleration (causing two activations of PD-4, one on initial deflection and one on return) which exceeded the highest level determined by the position of the light-detecting element PD4 which is operatively connected to counter unit C4. Likewise the count of 14 on counter unit C3 indicates that there have been seven accelerations which exceeded the next highest level determined by the position of detecting element PD3, and the same indications relate to counters C2 and C1. The count on C1 will indicate the total accelerations experienced above its minimum level. It will be seen that not only have accelerations been measured during the test period, but they have been counted and in effect classified as to number in each descrete magnitude category. This is a desirable advantageous result and is achieved in a simple direct manner with an uncomplicated compact device having minimum friction problems and minimum problems of wear and failure related to contact-type electrical switches. The power pulses passed by the detecting elements could also be applied if desired, each to a different channel of a magnetic recording tape via the conventional magnetic recording heads. This would enable use of the device for longer periods before changing the tape would be required, as compared with the period for resetting a counter.

It is believed to be apparent that applicant has provided an improved system in accordance with the objects of the invention. The structure described herein also could be adapted, within the spirit of the invention, for similarly digitally counting, digitally measuring and concurrently recording and classifying displacements of an object according to their magnitudes. This approach would have advantages in applications for example, where pressure pulses in a closed fluid system are to be monitored.

Obviously, many other modifications and variations of the present invention are possible in the light of the above teachings and disclosure. It is therefore to be understood that within the scope of the appended claims the invention may be practiced otherwise than as specifically described.

What is claimed is:

1. Acceleration responsive apparatus, comprising:
   a radiant energy source formed to be fixed to a structure;
   an opaque mass juxtapositioned from said source and displaceable relative thereto within predetermined limits in proportion to acceleration in one direction, said mass having an aperture therein forming a beam of the radiant energy displaceable with said mass;
   a plurality of radiant energy detectors juxtapositioned from said mass and fixed relative to said source, said detectors intercepting the beam at discrete displacements corresponding to predetermined increments of acceleration in said one direction; and
   a plurality of counter means each operatively connected to respective ones of said detectors for counting the number of times each of said predetermined increments of acceleration are exceeded.

2. The apparatus of claim 1 in which said radiant energy source comprises a visible light source, and said detectors comprise photodetecting units operatively connected to actuate said counter means when said photodetecting units are illuminated by light from said light source.

3. The apparatus of claim 2 in which said mass comprises an elongated flat element resiliently supported by spring support means connected to the structure for movement in the one direction.

4. The apparatus of claim 3 which further comprises: self-contained power supply means operatively connected to render said counter means, said detectors, and said light source operative.

* * * * *